(12) United States Patent
Naniwa et al.

(10) Patent No.: US 8,923,099 B2
(45) Date of Patent: Dec. 30, 2014

(54) HEAT ASSISTED MAGNETIC RECORDING HEAD GIMBAL ASSEMBLY AND HARD DISK DRIVE USING SAME

(75) Inventors: Irizo Naniwa, Fujisawa (JP); Takuya Matsumoto, Hachioji (JP); Satoshi Arai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/985,982

(22) PCT Filed: Feb. 22, 2011

(86) PCT No.: PCT/JP2011/053854
§ 371 (c)(1),
(2), (4) Date: Aug. 16, 2013

(87) PCT Pub. No.: WO2012/114460
PCT Pub. Date: Aug. 30, 2012

(65) Prior Publication Data
US 2013/0322221 A1    Dec. 5, 2013

(51) Int. Cl.
*G11B 11/00* (2006.01)
*G11B 5/48* (2006.01)
*G11B 5/31* (2006.01)
*G11B 5/60* (2006.01)
*G11B 13/04* (2006.01)
*G11B 5/00* (2006.01)

(52) U.S. Cl.
CPC .............. *G11B 13/04* (2013.01); *G11B 5/4826* (2013.01); *G11B 5/314* (2013.01); *G11B 2005/0021* (2013.01); *G11B 5/6088* (2013.01)
USPC ..................................... 369/13.33; 369/13.13

(58) Field of Classification Search
CPC ............................................... G11B 2005/0032
See application file for complete search history.

(56) References Cited

U.S. PATENT DOCUMENTS

| 2010/0046331 A1* | 2/2010 | Takayama et al. ......... 369/13.33 |
| 2010/0085664 A1* | 4/2010 | Hirata et al. ............... 369/13.33 |
| 2011/0013497 A1* | 1/2011 | Sasaki et al. .............. 369/13.33 |

(Continued)

FOREIGN PATENT DOCUMENTS

| JP | 2003-45004 | 2/2003 |
| JP | 2006-164414 | 6/2006 |

(Continued)

*Primary Examiner* — Tan X Dinh
(74) *Attorney, Agent, or Firm* — Antonelli, Terry, Stout & Kraus, LLP.

(57) ABSTRACT

Provided is a structure of a heat assisted magnetic recording head gimbal assembly that allows common inexpensive TE-mode LDs to be utilized. The heat assisted magnetic recording head gimbal assembly comprises: a light source unit having a light emitting element mounted on a parabolic solid submount; a heat assisted magnetic recording head comprising a magnetic recording element, a read element, a near field transducer, and a waveguide for guiding light from the light emitting element into the near field transducer; a slider including the heat assisted magnetic recording head and which flies above a disk; and a suspension for supporting the slider. The light emitting element of the light source unit is an edge-emitting LD and the light source unit is arranged on the opposite side of an bearing surface of the slider such that the light emitting surface of the light emitting element faces the slider, apertures are created in the suspension, and the slider is connected to the suspension in a way that a part of the light source unit penetrates through the apertures of the suspension.

6 Claims, 9 Drawing Sheets

(56) References Cited

U.S. PATENT DOCUMENTS

| | | | |
|---|---|---|---|
| 2011/0122735 A1* | 5/2011 | Kato et al. | 369/13.33 |
| 2011/0188354 A1* | 8/2011 | Sasaki et al. | 369/13.32 |
| 2011/0216635 A1* | 9/2011 | Matsumoto | 369/13.33 |
| 2012/0008470 A1* | 1/2012 | Shimazawa et al. | 369/13.33 |
| 2013/0064514 A1* | 3/2013 | Peng | 385/124 |
| 2013/0083637 A1* | 4/2013 | Peng | 369/13.33 |

FOREIGN PATENT DOCUMENTS

| | | |
|---|---|---|
| JP | 2008-310865 | 12/2008 |
| JP | 2009-54204 | 3/2009 |
| JP | 2009-163806 | 7/2009 |
| JP | 2009-170014 | 7/2009 |
| JP | 2009-266365 | 11/2009 |

* cited by examiner (A)

(B)

(C)

HEAT ASSISTED MAGNETIC RECORDING HEAD GIMBAL ASSEMBLY AND HARD DISK DRIVE USING SAME

TECHNICAL FIELD

The present invention relates to a heat assisted magnetic recording head gimbal assembly that comprises a heat assisted magnetic recording head executing heat assisted magnetic recording, which is one of the techniques to improve areal density of hard disk drives drastically, and a suspension of the head, and further relates to a hard disk drive using the head gimbal assembly.

BACKGROUND ART

In recent years, heat assisted magnetic recording is considered promising as one of the technique to improve areal density of hard disk drives drastically.

In order to improve areal density, it is necessary to make the bit size of recording lower. However, data missing is caused by heat fluctuation when making the bit size of the recording lower excessively. To prevent from such data missing, we should use high coercivity medium. However, ordinal magnetic heads cannot write data to the high coercivity medium. Hence, heat assisted magnetic recording is proposed: the heat assisted magnetic recording is the technique that writing is done after a spot, the size of which is about several ten nano meters×several ten nano meters, is heated more than to 200 degrees Celsius only when using the high coercivity medium. As the means for heating this spot, the utilization of near-filed light is examined. That is, the heat assisted magnetic recording head considered the utilization of near-filed light comprises a near-field transducer and waveguide in addition to write poles and a read element, and in the head. And laser beam passes through the waveguide, is conducted to the near-field transducer in the neighborhood of the writepoles, and is converted into near-field light by the near-field transducer.

As to a background art, for example, the below Patent Document 1 is already known. That is, this Patent Document 1 discloses as follows:

"The slider comprises a slider substrate, an electromagnetic transducer element, a near-field transducer, a waveguide receiving light from the reverse face of a medium opposite face, and conducting light to the medium opposite face, an electrode for an element electrically connected to the electromagnetic transducer element; the light source unit (LD unit: Laser Diode unit) comprises a light source supporting substrate (submount), a light source (LD: Laser Diode), a lead extending from the slider side to the opposite side of the slider, whose both ends are exposed on the surface of the light source unit; the electrode for the element of the slider is exposed on the reverse face of a medium opposite face without being covered by the light source unit; and the end of the lead at the side of the light source and the electrode for the element of the slider are soldered each other (Refer to Abstract).

PRIOR ART REFERENCES

Patent Document

Patent Document 1: JP-A-2009-54204

SUMMARY OF THE INVENTION

Problem to be Solved by the Invention

Now, it is desirable that the light source, an LD (Laser Diode) is formed in the neighborhood of a near-field transducer, that is, the inner of a slider in order to suppress transmission loss of laser beam. Under the present circumstances, however, it is impossible an LD is formed at the inner of the slider because cavity length of the LD is longer than the thickness of the slider (0.23 mm) on account of the restriction of necessary laser power. Next solution be worth considering is to mount the LD to the slider, but, in this case, it is also impossible the slider is used as the submount of the LD because of material property of the base material, AlTiC. Hence, persons in the art propose the solution that the submounter is made of the well used material (for example, aluminum nitride) as the submounter of LDs, and an LD unit housed an LD to the submounter is mounted to a slider. Generally, as the face of the slider to mount the LD unit, one can consider the four patterns, the opposite face of the side of an air bearing surface, side faces, the face of the side of a trailing edge, and the face of the side of a leading edge, except for the air bearing surface. It is difficult the LD is mounted on the air bearing surface because a pattern is formed over the whole surface in order to stabilize floating of the slider. Further, in the case that the LD is mounted on the face of the side of a trailing edge, to make a pad smaller or to rearrange a pad is necessary because the pad is formed on the face of the side of the trailing edge. Further, in the case that the LD is mounted on the face of the side of the leading edge, it is impossible mono waveguide is formed from a substrate (AlTiC) including the side of the leading edge to a near field transducer, and, as the result, transmission efficiency of light become lower owing to increase of coupling places. Further, in the case that the LD is mounted on the side faces, roll inertia become larger, and then shock resistance become worse. From the above, the last choice is mounting on the opposite face of the side of the air bearing surface.

On the other hand, there are two types of laser diodes, edge-emitting LDs and surface-emitting LDs. Edge-emitting LDs are the laser diodes that its resonators are built-up with parallel to a semiconductor substrate, which emit light from clearage side faces. In the types of edge-emitting LDs, we call the one that the polarization is parallel to the semiconductor substrate "edge-emitting LDs of TE (transverse electric) mode", and the one that the polarization is vertical to the semiconductor substrate "edge-emitting LDs of TM (transverse magnetic) mode". Surface-emitting LDs are the Laser diodes which emit light with vertical to the semiconductor substrate. Wide used laser diode type in general is the type of the edge-emitting LDs of TE mode. They have high reliability, are low in price, and can be produced in large scale. Costs and productivity are important factors because many LDs are necessary when using the LDs for heat assisted magnetic recording.

Generally, near field transducers have the form such that their conversion efficiency become maximum when the polarization of the LDs is parallel to the layered surface of the heat assisted magnetic recording head.

According to the structure of the heat assisted magnetic recording head gimbal assembly described in the above Patent Document 1, the heat assisted magnetic recording head gimbal assembly has the mechanism that an LD is mounted on the opposite face of the side of a air bearing surface. However, when we adopt edge-emitting LDs of TE mode for the LD unit described in Patent Document 1, we cannot use the edge-emitting LDs of TE mode without alteration because the polarization is parallel to the layered face of the heat assisted magnetic recording head, so that it is necessary to add a polarization rotation to the LD unit, or to use a costly edge-emitting LD of TM mode or a surface-emitting LD. We can consider the other solutions that an edge-emitting LD of TE mode is used after altering the form of the LD unit that the near field transducer is rotated 90 degree. But in the case, a manufacturing process for the heat assisted magnetic recording head gimbal assembly is complicated, as the result, the heat assisted magnetic recording head gimbal costs highly as a whole.

In addition, according to Patent Document 1, the LD unit is large in comparison with the slider, so that there is the possibility that the LD unit cannot be mounted owing to interference with the adjacent head.

Therefore, the present invention has been made for solving the problems described above and the object thereof is to provide a heat assisted magnetic recording head gimbal assembly which is unnecessary to add the polarization rotation, or to alter the form of the LD unit that the near field transducer is rotated 90 degree even when using a popular and low price edge-emitting LD of TE mode.

In addition, the object of the present invention is to provide a heat assisted magnetic recording head gimbal assembly which can be mounted to a hard disk drive by suppressing protruding length of the LD to the side of the load-beam of the suspension, and the hard disk drive using the head.

Means for Solving the Problem

In order to achieve the object, according to the present invention, first, we provide a heat assisted magnetic recording head gimbal assembly comprising: a light source unit mounting a light emitting element to a rectangular solid submount; a heat assisted magnetic recording head comprising a magnetic record element, a read element, a near field transducer, and a waveguide guiding the light from the light emitting element to said near field transducer; a slider including the heat assisted magnetic recording head, and flying above disk; and a suspension supporting the slider; wherein the light emitting element of the light source unit is an edge-emitting LD of TE mode, and the light source unit is arranged in a way that the light source unit is on the opposite side to an air bearing surface, and the emitting surface of the light emitting element is opposite to the slider; wherein the suspension is formed apertures; and wherein the slider is jointed to the suspension in a way that the part of the light source unit penetrates through the apertures of the suspension.

Further, according to the present invention, as to the heat assisted magnetic recording head gimbal assembly, it is desirable that the shape of the submount is L-Shape, and the joint part of the submount to the slider is put between the suspension and the slider. And moreover, it is desirable that the light source unit is arranged on the opposite side to an air bearing surface in a way that the substrate surface of the light emitting element and the layered surface of the heat assisted magnetic recording head are orthogonal respectively, and further that a wiring is formed on the joint part of the suspension to the slider for supplying power; wirings are formed on the joint part of the light emitting element to the submount and on the opposite side to the joint part respectively; a metal film is formed on the joint surface of the submount to the light emitting element; the wiring formed on the joint part of the light emitting element to the submount is connected to the metal film formed at the joint surface of the submount; a metal film is exposed at the end of the one side of the wiring in the neighborhood of the light source unit in the direction of the opposite side to the joint surface to the slider; and the wiring formed on the opposite side to the joint part of the light emitting element to the submount and the metal film formed on the submount are electrically connected to the end of the metal film of the wiring.

Moreover, as to the heat assisted magnetic recording head gimbal assembly, according to the present invention, it is desirable that apertures formed to the suspension are holes or notches, and said holes or notches prevent from interfering with the light source unit, and further that the light emitting element is coated with resin.

And according to the present invention, we provide a hard disk drive using the heat assisted magnetic recording head gimbal assembly described above.

Effect of Invention

According to the above described present invention, we can implement heat assisted magnetic recording using a popular and low price edge-emitting LD of TE mode.

MODE FOR CARRYING OUT THE INVENTION

Hereinafter, embodiments of the present invention are described in detail using attached figures.

Embodiment 1

First, the first embodiment of the present invention, a hard disk drive comprising a heat assisted magnetic recording head gimbal assembly is described.

In this first embodiment, an example of heat assisted magnetic recording head gimbal assembly is described using a popular and low price edge-emitting LD of TE mode and a simple submount.

Figure 1:
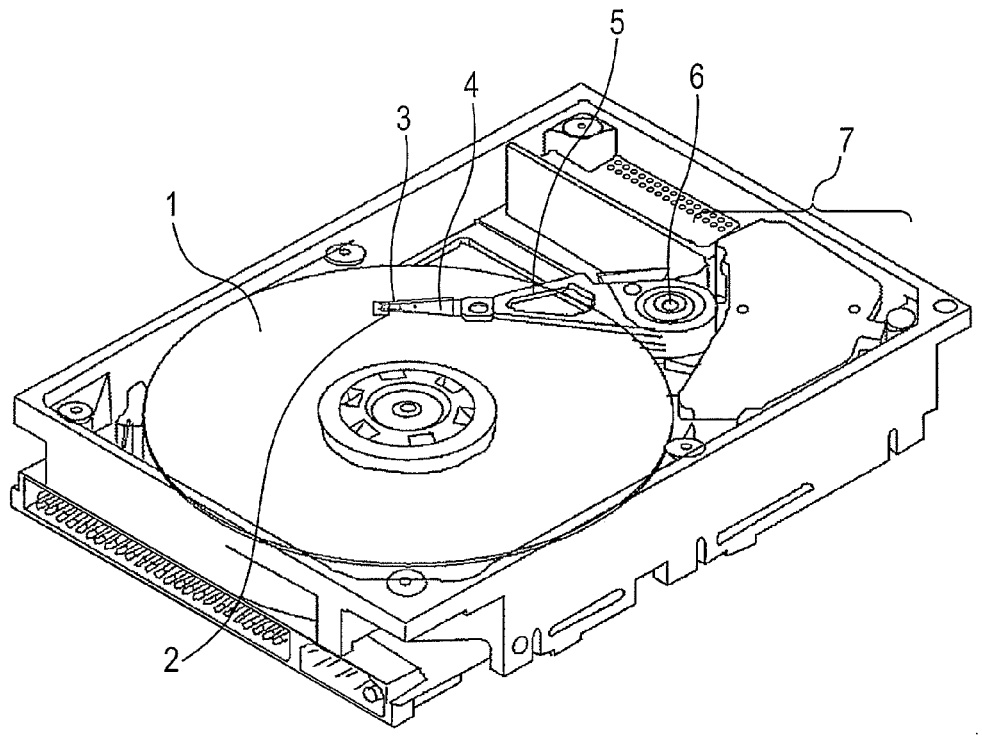
FIG. 1 is a configuration drawing showing a hard disk drive comprising a heat assisted magnetic recording head gimbal assembly of the present invention.
Figure 2:
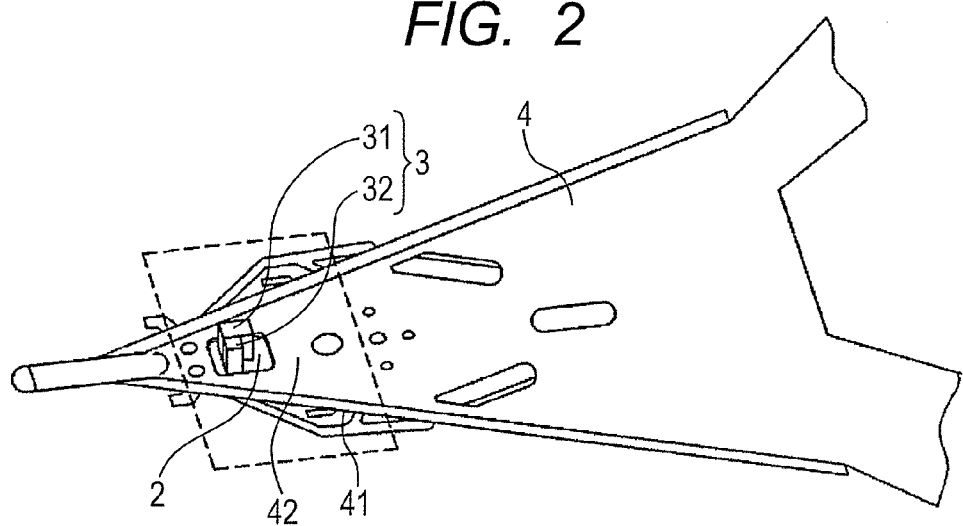
FIG. 2 is a perspective view showing on an enlarged scale the above heat assisted magnetic recording head gimbal assembly.
Figure 3:
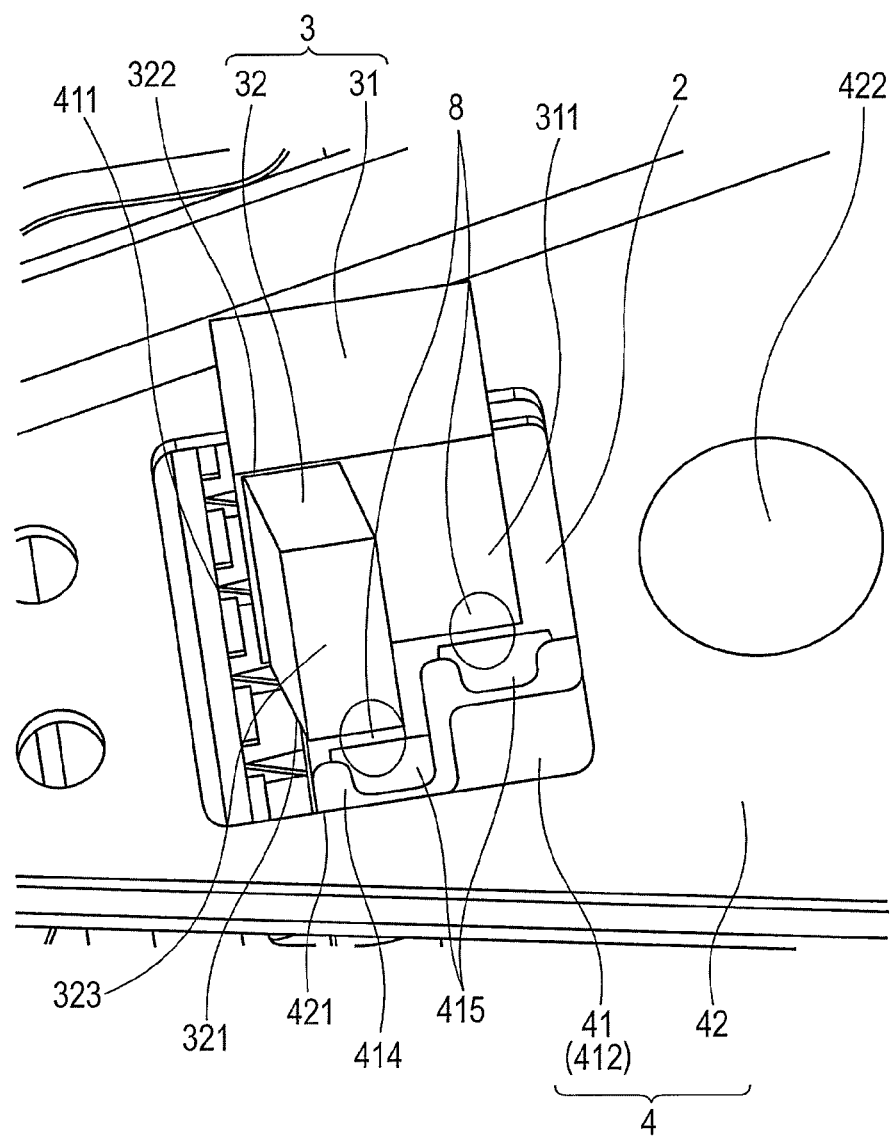
FIG. 3 is a perspective view showing on an enlarged scale the neighborhood of an LD unit in the above heat assisted magnetic recording head gimbal assembly.
Figure 4:
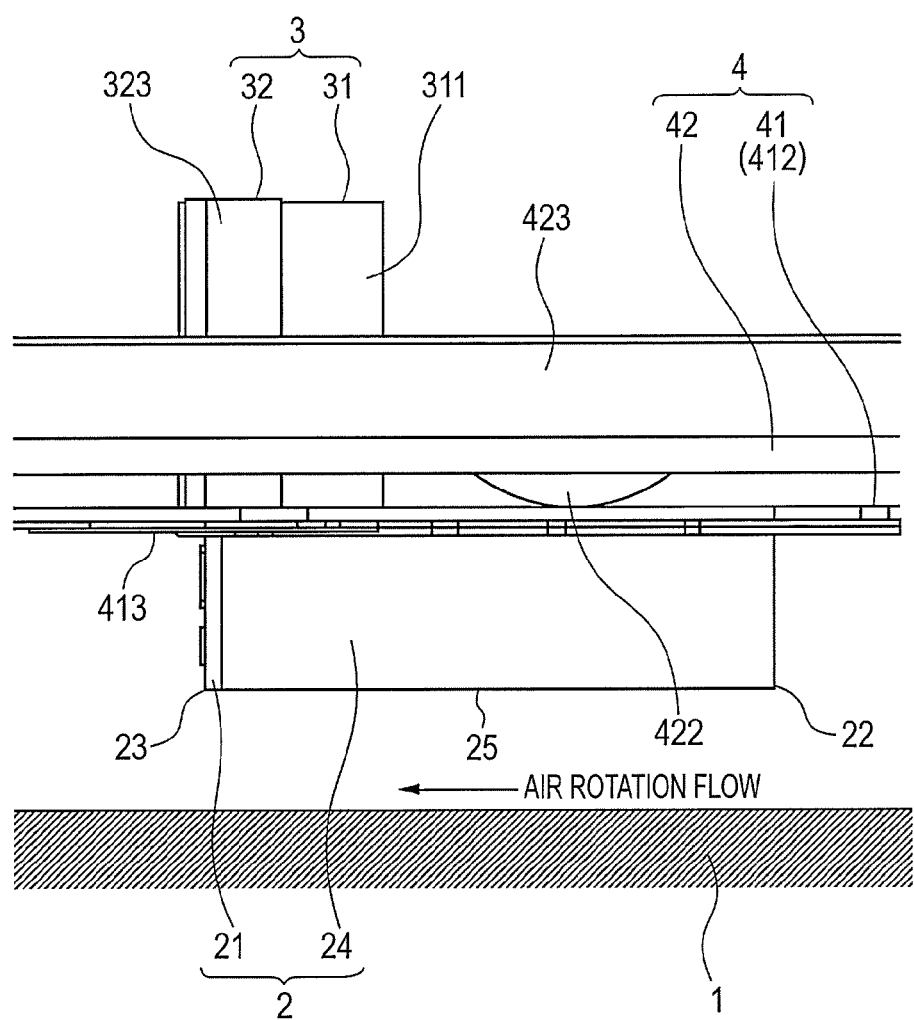
FIG. 4 is a side view showing on an enlarged scale the neighborhood of an LD unit in the above heat assisted magnetic recording head gimbal assembly.
Figure 5:
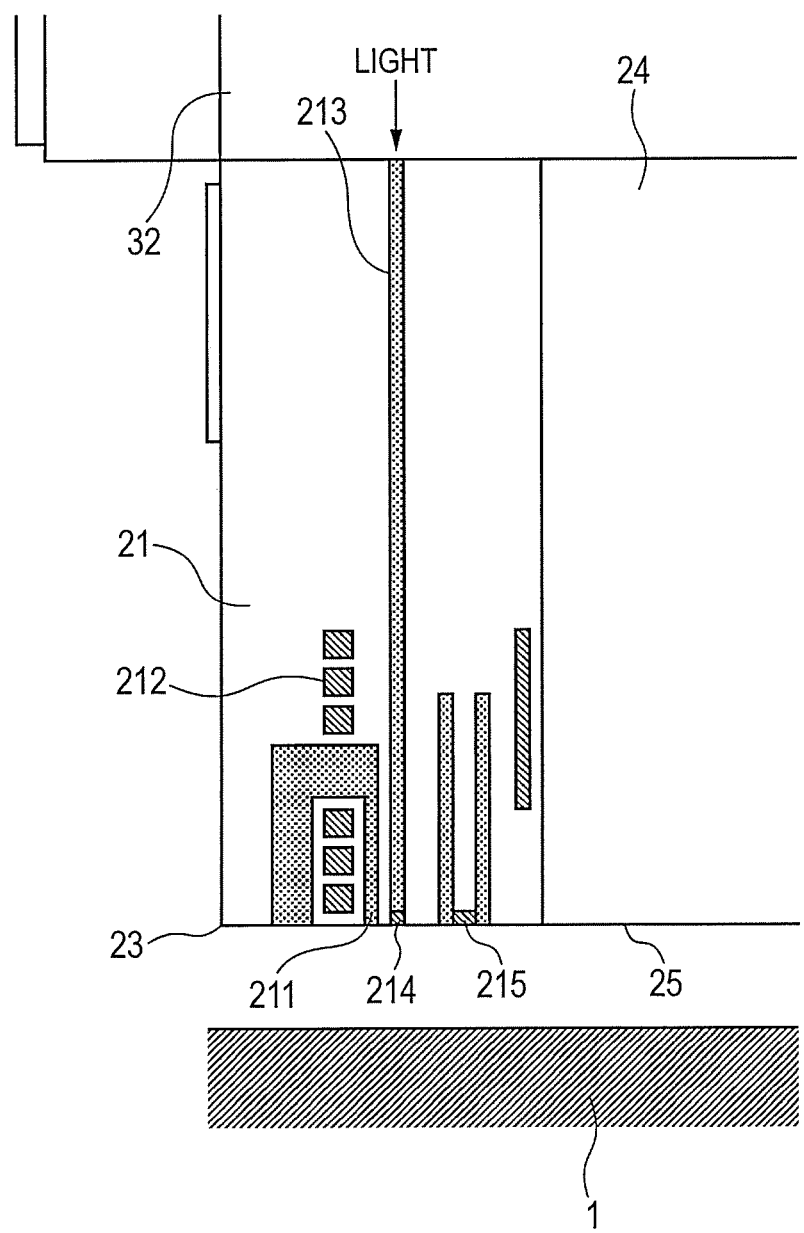
FIG. 5 is a sectional drawing schematically showing on an enlarged scale a part of the above heat assisted magnetic recording head gimbal assembly.
Figure 6:
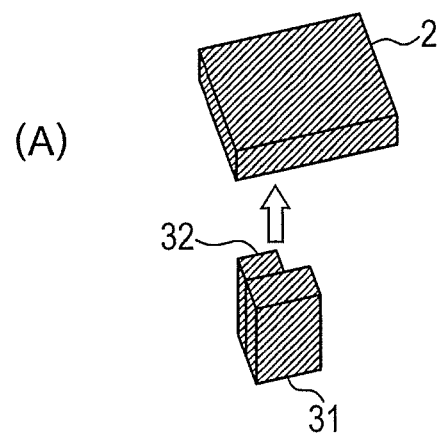
FIG. 6 is a perspective and exploded view showing the neighborhood of an LD unit in the above heat assisted magnetic recording head gimbal assembly with a steps of assembling thereof.
Figure 6:
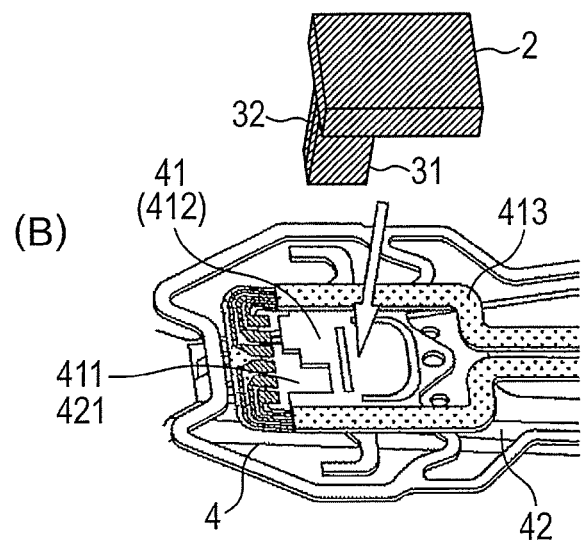
Figure 6:
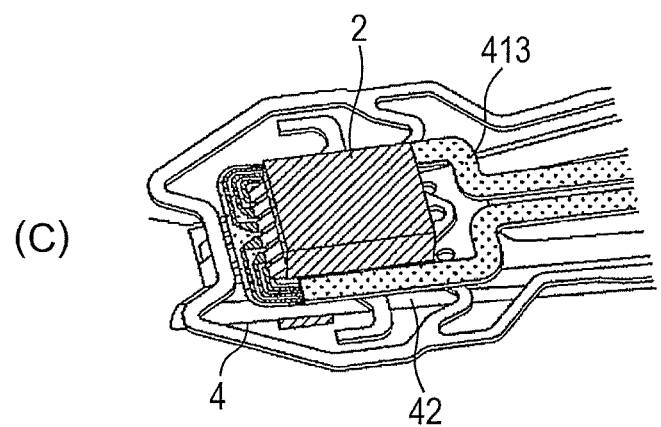

FIG. 1 is a configuration drawing showing a hard disk drive comprising a heat assisted magnetic recording head gimbal assembly of the present invention; FIG. 2 is a perspective view showing on an enlarged scale the above heat assisted magnetic recording head gimbal assembly; FIG. 3 is a perspective view showing on an enlarged scale the neighborhood of an LD unit in the above heat assisted magnetic recording head gimbal assembly; FIG. 4 is a side view showing on an enlarged scale the neighborhood of an LD unit in the above heat assisted magnetic recording head gimbal assembly; FIG. 5 is a sectional drawing schematically showing on an enlarged scale a part of the above heat assisted magnetic recording head gimbal assembly; and FIG. 6 is a perspective and exploded view showing the neighborhood of an LD unit in the above heat assisted magnetic recording head gimbal assembly with steps of assembling thereof.

In these figures, a disk 1 is supported under rotatable condition (refer to FIG. 1), and a slider 2 comprising a magnetic head 21 flies above the disk 1 with preserving designated gap by air rotation flow flowing from a leading edge 22 to a trailing edge 23 (refer to FIG. 4). A heat assisted magnetic recording head 21 is formed on the mount, a slider substrate 24 under condition that thin films are layered in the thin films layering process. The magnetic head 21 comprises a write pole 211, a write coil 212, a waveguide 213, a near field transducer 214, and a read element 215. Further, the reference numeral 24 indicates the slider substrate.

On the other hand, a light source (LD) unit 3 is mounted on the slider 2, and LD (Laser diode) 32 is formed on a submount 31 of the light source (LD) unit 3 (refer to FIG. 4). The slider 2 is supported by a suspension 4. The suspension 4 comprises a flexure 41 and a load beam 42, and is supported by a carriage-arm 5. The carriage-arm 5 is supported under rotatable condition in a way that a pivot 6 is the axis of rotation. Further, the reference numeral 7 indicates a voice coil motor.

That is, according to the above stated hard disk drive, the carriage-arm 5 is swung in a way that the voice coil motor 7 is driven, and the magnetic head 21 is moved to the objective track on the rotated disk 1, hence, to read and write information is executed.

The above LD unit 3 is, as shown in FIGS. 3, 4, mounted on the opposite side of an air bearing surface 25 of the slider 2 in such a way that a emitting surface of the LD 32 opposites to the slider 2, and the substrate surface of the LD 32 is orthogonal to the layered surface (refer to FIG. 4) of the heat assisted magnetic recording head 21.

Further, the part joined to the slider 2 is the submount 31 of the LD unit 3. Moreover, the LD 32 under condition that thin films are also layered in the thin films layering process in the same way as the heat assisted magnetic recording head 21. In addition, the reference numeral 422, what is called, a dimple, and 423 indicates a flange.

By the above structure, we can execute a heat assisted magnetic recording using head using a popular and low price edge-emitting LD of TE mode.

Next, the above stated submount 31 is a simple rectangular solid (refer to FIGS. 3, and 4), and a metal film 311 is deposited by vaporization on the whole of the joint surface to the LD 32. On the other hand, the metal film 311 is conducted electrically to an electrode 322 at the side of the joint surface to the LD 32. Incidentally, we can mention, as the material of the substrate of the submount 31, for example, aluminum nitride.

Then, as also shown in FIG. 6, the flexure 41 and load beam 42 of the suspension 4 are formed holes 411, 421 respectively as apertures. The LD unit 3 (31, 32) is set in a way that it penetrates through the holes 411, 421 so that the LD unit 3 (31, 32) can be mounted without interference with the suspension 4. Incidentally, in this embodiment, we have explained the holes 411, 421 respectively formed as the apertures of the flexure 41 and load beam 42, however, the embodiment of the present invention is not restricted to this shape, they can be, for example, notches.

On the other hand, a substrate 412 of the flexure 41 is formed of, for example, stainless, and on the side of joint surface to the slider, a wiring 413 electrically connected to the magnetic head 21 and a wiring 414 electrically connected to the LD 32 are formed (refer to FIG. 4). The end of the one side of the wiring 414 is in the neighborhood of the hole 411 formed to the flexure 41, and at the end part, the substrate 412 is etched, so that it has a shape that a metal part 415 is exposed (refer to FIG. 3). On the other hand, electric power can be supplied to the LD 32 by electrically connecting the electrode 323 on the opposite side of joint surface to the LD 32 and the metal film 311 on the submount 31, to the metal part 415 of the wiring 413. Thus, electric power can be supplied to the LD 32 without patterning the electrodes 322, 323 or the metal film 311 on the submount. Incidentally, in this embodiment, we have used conductive adhesive 8 for this connection, but solder can be used for the connection.

Thus, it is possible that LD 32 is emitted light by supplying power to the LD 32 via the wiring 414. The laser beam emitted from the opposite side to the slider 2 of the LD 32 enters the waveguide 213 formed in the heat assisted magnetic recording head 21 (refer to FIG. 5), goes through said waveguide 213, and is guided to the near field transducer 214. And this laser beam is converted to near field light by the near field transducer 214, then the near field light heats the spot to be written data on medium. At the same time, heat assisted magnetic recording is executed by flowing current to the write coil 212, and applying magnetic field to the write pole 211. Incidentally, the medium is formed on the disk 1.

In this embodiment, we have explained the situation that the LD 32 is used without elaborating, however, if the LD 32 or the LD unit 3 is coated with resin etc., it can prevent debris generated the LD 32 from scattering in the hard disk drive.

Furthermore, if a sensor (not shown) for measuring density of light is set, and the signal from said sensor is returned to a driving circuit (not shown) of the LD 32 as feedback, it is possible to control oscillation of the LD 32.

Embodiment 2

Next, the second embodiment of the present invention, a hard disk drive comprising a heat assisted magnetic recording head gimbal assembly is described. In this embodiment, we described that an LD unit can be mounted to the hard disk drive by making the length of sticking out of the LD unit from a suspension lower. Incidentally, we mark the same numeric symbol to elements already described, and parts having the same function as the construction of heat assisted magnetic recording head gimbal assembly of Embodiment 1, however, the detail explanation is omitted to avoid repetition.

Figure 7:
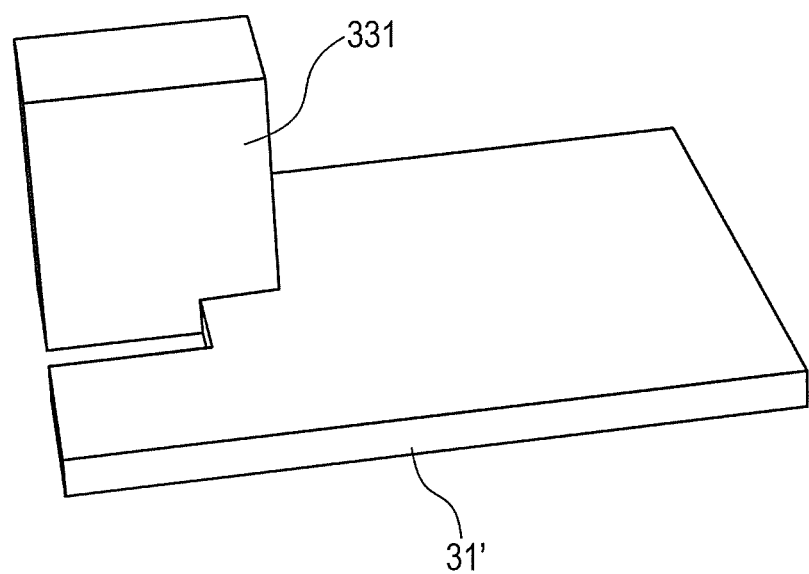
FIG. 7 is a perspective view showing a submount used for a heat assisted magnetic recording head of Embodiment 2.
Figure 8:
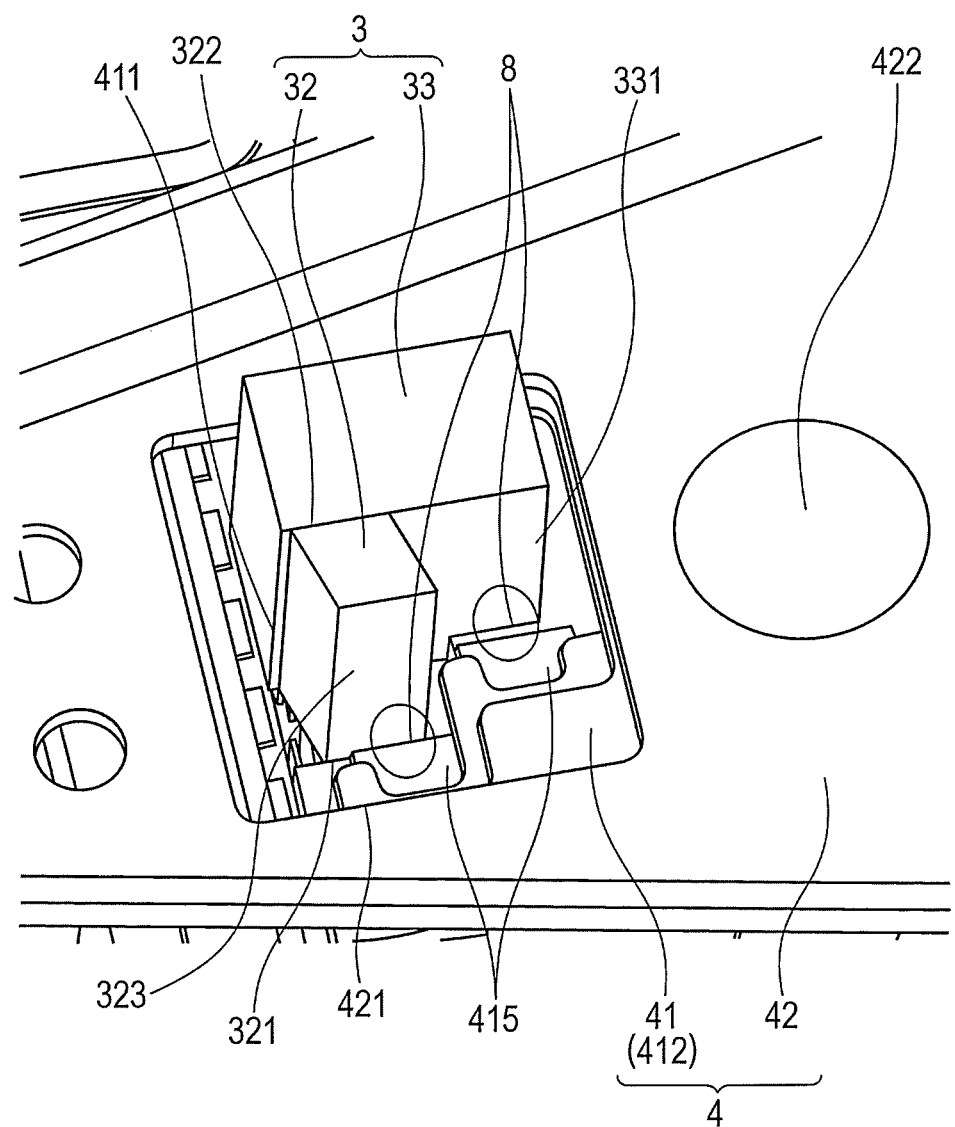
FIG. 8 is a perspective view showing on an enlarged scale the neighborhood of the LD unit in said heat assisted magnetic recording head gimbal assembly.
Figure 9:
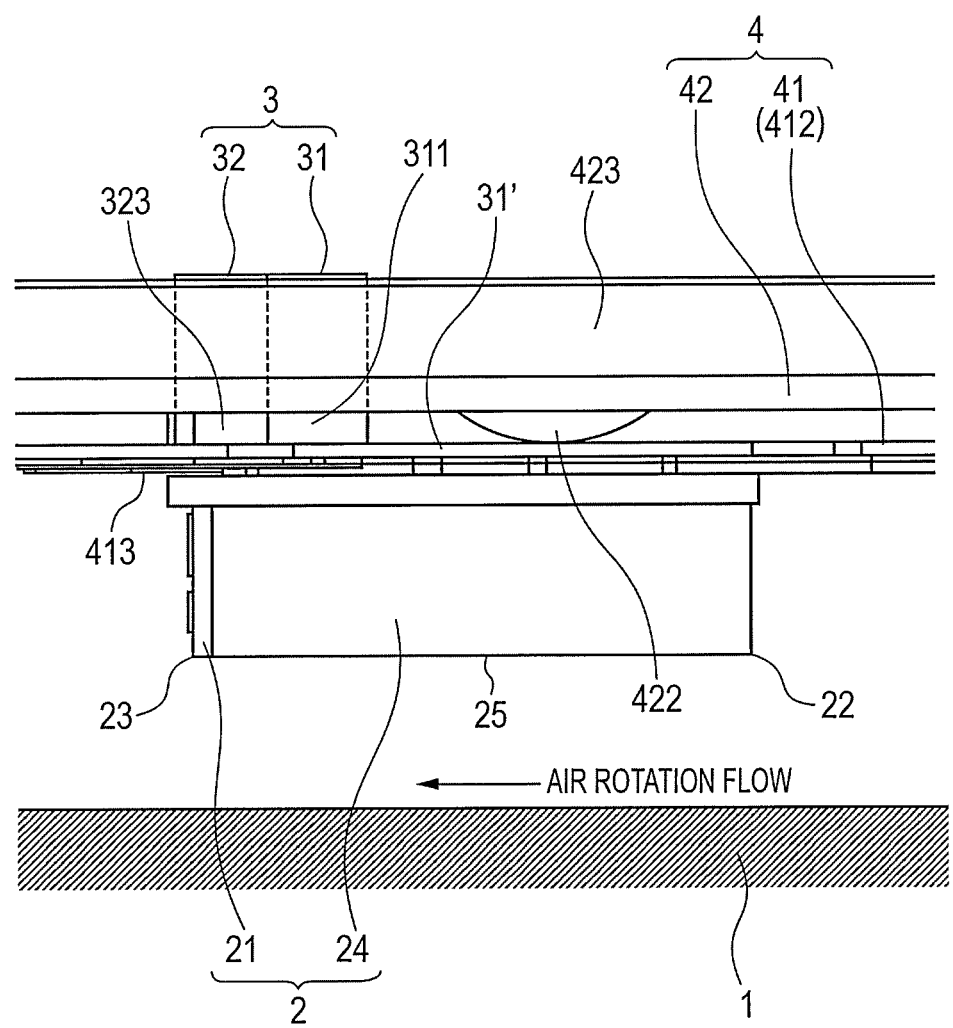
FIG. 9 is a side view of the neighborhood.
Figure 10:
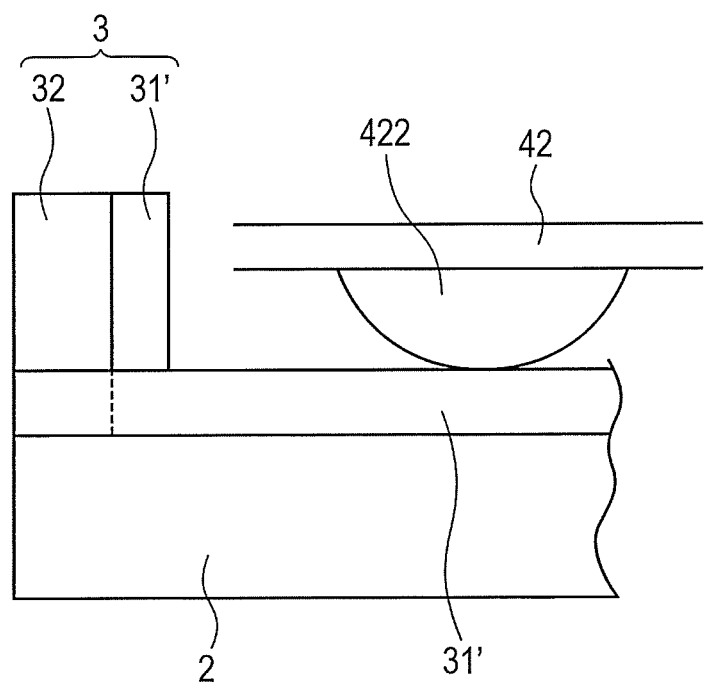
FIG. 10 is a sectional drawing showing on an enlarged scale in a way that the submount is focused.

First, the attached FIG. 7 is a perspective view showing a submount used for a heat assisted magnetic recording head of Embodiment 2; FIG. 8 is a perspective view showing on an enlarged scale the neighborhood of the LD unit in said heat assisted magnetic recording head gimbal assembly; FIG. 9 is a side view of the neighborhood; and FIG. 10 is a sectional drawing showing on an enlarged scale in a way that the submount is focused.

In this Embodiment 2, a submount 31' is L-Shape when viewing from the side (refer to FIG. 7). And a metal film 331 is deposited by vaporization on the whole of the joint surface to the LD 32. This metal film 331 is conducted electrically to an electrode 321 on the side of the joint surface to the LD 32. Further, the flexure 41 and load beam 42 of the suspension 4 are formed holes 411, 421 respectively as the same way as above (refer to FIG. 8).

And then the joint part of the L-Shape submount 31' to the slider 2 is made the shape put between a dimple 422 formed on a load beam 42 and the slider 2, and then the LD 32 (refer to FIG. 10) and the joint part of the L-Shape submount 31' to the LD 32 are made the shape penetrated into the holes 411, 421 respectively (refer to FIGS. 8, and 9), so that it is possible to make the length of sticking out of the LD 32 and the L-Shape submount 33 to the side of the flange 423 lower. Furthermore, in some cases, it is possible to make the height of the LD 32, and the submount 31' lower than that of the flange 423 of the load beam 42.

Incidentally, also in this embodiment, the holes 411, 421 are made at the flexure 41 and load beam 42 respectively, however, the shapes are not holes, but they can be notches.

Furthermore, a substrate 412 of the flexure 41 is formed of stainless, and on the side of joint surface to the slider, a wiring 413 electrically connected to the magnetic head 21 and a wiring 414 electrically connected to the LD 32 are formed. The end of the one side of the wiring 414 is in the neighborhood of the hole 411, and at the end part, the substrate 412 is etched, so that it has a shape that a metal part 415 is exposed. Thus, electric power can be supplied to the LD 32 by electrically connecting the electrode 321 on the opposite side of joint surface to the LD 32 and the metal film 331 on the submount, to the metal part 415 of the wiring 414. In this embodiment, we have used conductive adhesive 8 for this connection, but solder may be used for the connection.

Furthermore, it is possible that LD 32 is emitted light by supplying power to the LD 32 via the wiring 414. The laser beam emitted from the opposite side to the slider 2 of the LD 32 enters the waveguide 213 formed in the heat assisted magnetic recording head 21, goes through said waveguide 213, and is guided to the near field transducer 214. And this laser beam is converted to near field light by the near field transducer 214, then the near field light heats the spot to be written data on medium. At the same time, heat assisted magnetic recording is executed by flowing current to the write coil 212, and applying magnetic field to the write pole 211. Incidentally, the medium is formed on the disk 1.

In this embodiment, the LD 32 is used without elaborating, however, if the LD 32 or/and the LD unit 3 is coated with resin etc., it can prevent debris generated the LD 32 from scattering in the hard disk drive.

DESCRIPTION OF THE REFERENCE NUMERALS

1 . . . disk, 2 . . . slider, 21 . . . heat assisted magnetic recording head, 211 . . . write pole, 212 . . . write coil, 213 . . . waveguide, 214 . . . near field transducer, 215 . . . read element 24 . . . slider substrate, 3 . . . light source (LD) unit, 31 . . . submount, 31' . . . L-Shape submount, 311 . . . metal film on the surface of submount, 32 . . . LD (Light Emitting Diode), 321 . . . emitting surface of LD, 322 . . . electrode of LD, 323 . . . electrode of LD, 4 . . . suspension, 41 . . . flexure, 411 . . . hole formed to flexure, 412 . . . substrate of flexure, 413 . . . wiring for connecting to magnetic head, 414 . . . wiring for connecting to LD, 415 . . . metal part of flexure wiring, 42 . . . load beam, 421 . . . hole formed to load beam, 422 . . . dimple, 423 . . . flange, 5 . . . carriage-arm, 6 . . . pivot, 7 . . . voice coil motor, 8 . . . conductive adhesive.

The invention claimed is:

1. A heat assisted magnetic recording head gimbal assembly comprising:
    a light source unit mounting a light emitting element to a rectangular solid submount;
    a heat assisted magnetic recording head comprising a magnetic record element, a read element, a near field transducer, and a waveguide guiding the light from the light emitting element to said near field transducer;
    a slider including the heat assisted magnetic recording head, and configured to fly above disk; and
    a suspension supporting the slider;
    wherein the light emitting element of the light source unit is an edge-emitting LD of TE mode, and the light source unit is arranged in a way that the light source unit is on the opposite side to an air bearing surface, and the emitting surface of the light emitting element is opposite to the slider;
    wherein the suspension is formed with apertures; and
    wherein the slider is jointed to the suspension in a way that a part of the light source unit penetrates through the apertures of the suspension:
    wherein a wiring is formed on a joint of the suspension to the slider for supplying power;
    wirings are formed on the joint part of the light emitting element to the submount and on the opposite side to the joint part respectively;
    a metal film is formed on the joint surface of the submount to the light emitting element;
    the wiring formed on the joint part of the light emitting element to the submount is connected to the metal film formed on the joint surface of the submount;
    a metal film is exposed at the end of the one side of the wiring in the neighborhood of the light source unit in the direction of the opposite side to the joint surface to the slider; and
    the wiring formed on the opposite side to the joint part of the light emitting element to the submount and the metal film formed on the submount are electrically connected to the end of the metal film of the wiring.

2. The heat assisted magnetic recording head gimbal assembly according to claim 1,
    wherein the shape of the submount is L-Shape, and the joint part of the submount to the slider is put between the suspension and the slider.

3. The heat assisted magnetic recording head gimbal assembly according to claim 1,
    wherein that the light source unit is arranged on the opposite side to an air bearing surface in a way that the substrate surface of the light emitting element and the layered surface of the heat assisted magnetic recording head are orthogonal respectively.

4. The heat assisted magnetic recording head gimbal assembly according to claim 1,
    wherein the apertures formed in the suspension are holes or notches, and said holes or notches prevent from interfering with the light source unit.

5. The heat assisted magnetic recording head gimbal assembly according to claim 1,
    wherein the light emitting element is coated with resin.

6. A hard disk drive comprising at least one of the heat assisted magnetic recording head gimbal assembly according to claim 1.

* * * * *